(12) United States Patent
Ponnuswamy

(10) Patent No.: US 10,129,765 B2
(45) Date of Patent: Nov. 13, 2018

(54) ADAPTIVE WIRELESS COVERAGE CONFIGURATIONS

(71) Applicant: KodaCloud Inc., Campbell, CA (US)

(72) Inventor: Subbu Ponnuswamy, Saratoga, CA (US)

(73) Assignee: KodaCloud Inc., Campbell, CA (US)

( * ) Notice: Subject to any disclaimer, the term of this patent is extended or adjusted under 35 U.S.C. 154(b) by 201 days.

(21) Appl. No.: 14/834,054

(22) Filed: Aug. 24, 2015

(65) Prior Publication Data

US 2017/0064567 A1   Mar. 2, 2017

(51) Int. Cl.
*H04W 24/02* (2009.01)
*H04W 36/30* (2009.01)
*H04W 36/08* (2009.01)
*H04W 48/16* (2009.01)

(52) U.S. Cl.
CPC .................. *H04W 24/02* (2013.01)

(58) Field of Classification Search
CPC ..... H04W 36/30; H04W 36/08; H04W 48/16; H04W 52/0245; H04W 48/20; H04W 24/02; H04W 52/245; Y02D 70/142; Y02D 70/168; Y02D 70/00; Y02D 70/164
See application file for complete search history.

(56) References Cited

U.S. PATENT DOCUMENTS

| 7,084,809 | B2 * | 8/2006 | Hockley, Jr. | ......... G01S 5/0072 |
| | | | | 342/357.48 |
| 7,239,277 | B2 * | 7/2007 | Fullerton | ............. G01S 5/0289 |
| | | | | 342/458 |
| 9,042,324 | B2 * | 5/2015 | Zhang | ................... H04W 72/04 |
| | | | | 370/329 |
| 2002/0075825 | A1 | 6/2002 | Hills et al. | |
| 2003/0148765 | A1 * | 8/2003 | Ma | ....................... H04W 36/32 |
| | | | | 455/438 |
| 2005/0246334 | A1 * | 11/2005 | Tao | ....................... H04W 64/00 |
| 2007/0207816 | A1 * | 9/2007 | Spain, Jr. | .............. H04W 64/00 |
| | | | | 455/456.1 |
| 2010/0284345 | A1 * | 11/2010 | Rudrapatna | ......... H04W 72/082 |
| | | | | 370/329 |
| 2011/0183683 | A1 | 7/2011 | Das et al. | |
| 2011/0237259 | A1 * | 9/2011 | Dimou | .............. H04W 36/0061 |
| | | | | 455/437 |
| 2015/0094085 | A1 * | 4/2015 | Agrawal | .............. A01K 1/0114 |
| | | | | 455/456.1 |

(Continued)

*Primary Examiner* — Pablo Tran
(74) *Attorney, Agent, or Firm* — Invoke

(57) ABSTRACT

A system and method of determining adaptive wireless coverage configurations is disclosed. One or more network devices receive wireless signals from a wireless device at respective signal strength values that are above a minimum threshold. The network devices are identified as a first subset of network devices. Additionally or alternatively, one or more network devices transmit wireless signals that are received by the wireless device at respective signal strength values that are above a minimum threshold. The network devices are identified as a second subset of network devices. Based on the number of network devices in the first subset of network devices and/or the number of network devices in the second subset of network devices, a wireless coverage configuration corresponding to a location associated with the wireless device is modified.

16 Claims, 7 Drawing Sheets

(56) References Cited

U.S. PATENT DOCUMENTS

2015/0312724 A1   10/2015  Singh et al.
2016/0037424 A1    2/2016  Xie et al.
2016/0119838 A1    4/2016  Kapoor et al.

* cited by examiner

ADAPTIVE WIRELESS COVERAGE CONFIGURATIONS

RELATED APPLICATIONS

This application is related to U.S. patent application Ser. No. 14/788,310, filed Jun. 30, 2015, titled "Estimating Signal Strength at a Target Device," which is hereby incorporated by reference.

TECHNICAL FIELD

The present disclosure relates to wireless coverage configurations in a wireless environment. In particular, the present disclosure relates to adaptive wireless coverage configurations.

BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band.

Client devices within WLANs communicate with network devices to obtain access to one or more network resources. Network devices, such as access points, are digital devices that may be communicatively coupled to one or more networks (e.g., Internet, an intranet, etc.). Network devices may be directly connected to the one or more networks or connected via a controller. A network device, as referred to herein, may include a wireless access point (WAP) that communicates wirelessly with devices using Wi-Fi, Bluetooth or related standards and that communicates with a wired network. A network device may provide a wireless coverage area, within which devices may wirelessly connect to a network through the network device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
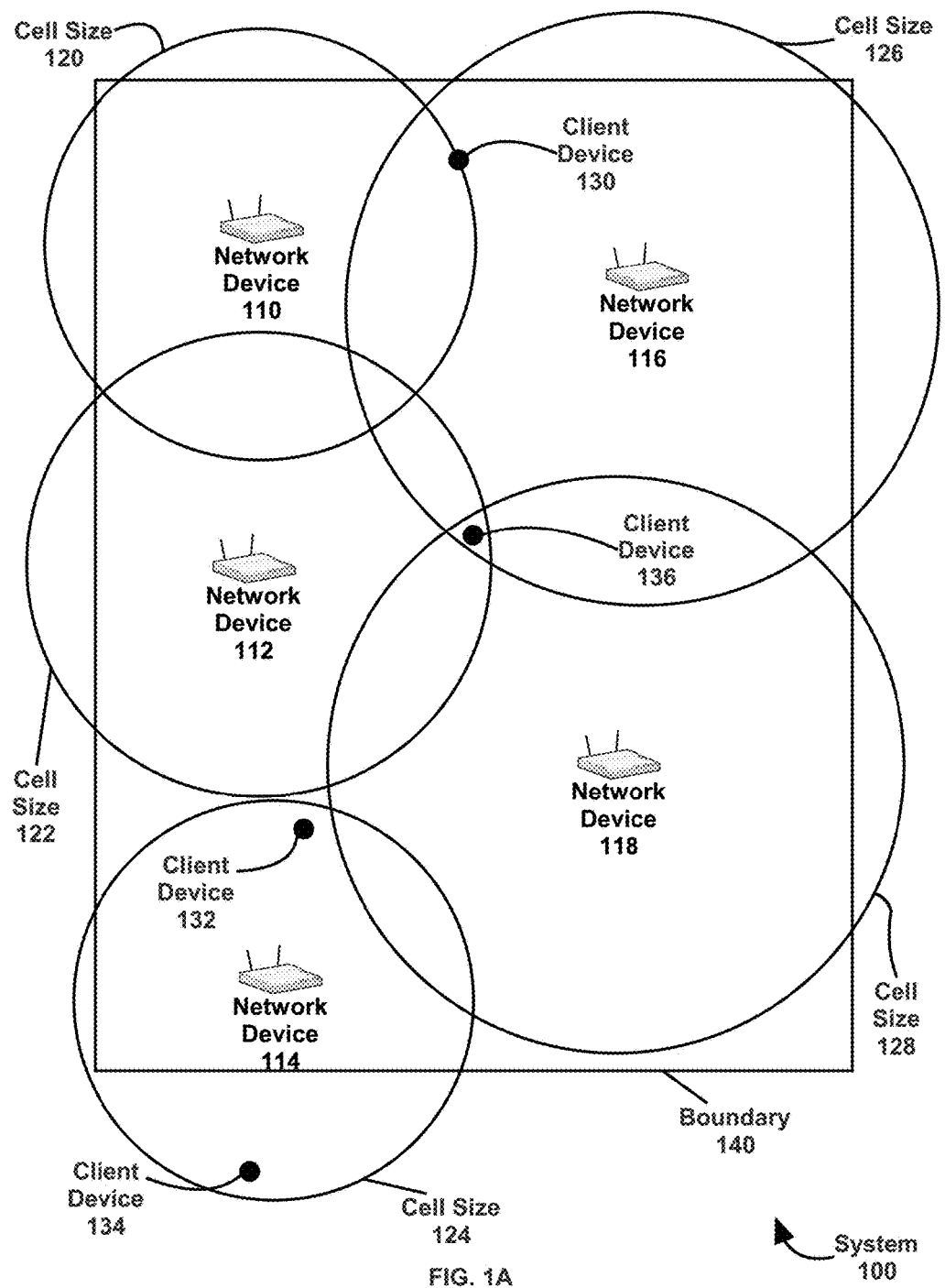
FIG. 1A shows an example deployment of network devices of a system in accordance with one or more embodiments.

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. General Overview

In one or more embodiments, a minimum level of wireless coverage is desired. A desired level of wireless coverage is defined by (a) a minimum number of network devices that receive wireless signals from a client device at or above a threshold, and/or (b) a minimum number of network devices that transmit wireless signals that are received by a client device at or above a threshold. If the minimum number of network devices are not satisfied for a particular client device, then the location of the particular client device is referred to herein as a "wireless coverage hole," or a "coverage hole."

In one or more embodiments, wireless coverage configurations are determined in order to achieve a desired level of wireless coverage. A current level of wireless coverage is monitored. Based on the current level of wireless coverage, coverage holes are identified. One or more wireless coverage configurations corresponding to a coverage hole are modified such that an increased number of network devices receive wireless signals from a client device located within the coverage hole, at or above a threshold. Additionally or alternatively, one or more wireless coverage configurations corresponding to a coverage hole are modified such that a client device located within the coverage hole receives wireless signals from an increased number of network devices, at or above a threshold. Wireless coverage configurations include but are not limited to transmit power, receive sensitivity, receive gain, probe response threshold, disconnect threshold, Modulation and Coding Scheme (MCS) and/or Physical Layer (PHY) rate, radio frequency (RF) channel, and addition and/or movement of network devices. Wireless coverage configurations may be used to modify a wireless communication cell size (such as a transmit cell size and/or a receive cell size).

In one or more embodiments, wireless coverage configurations are not modified for a coverage hole that is located at an edge of a wireless coverage area. A wireless coverage area is a physical space in which the desired level of wireless coverage is to be provided. A wireless coverage area may be, for example, the interior of a building, one or more floors of a building, one or more specific rooms in a building, an outdoor region within a particular boundary (such as a park), or any other area. After identifying a coverage hole and prior to modifying a wireless coverage configuration, an inquiry may be made as to whether the coverage hole is located at an edge of a wireless coverage area.

B. Architectural Overview

FIG. 1A shows an example deployment of network devices of a system in accordance with one or more embodiments. As illustrated in FIG. 1A, system 100 includes network devices 110-118, client devices 130-136, and boundary 140. In one or more embodiments, system 100 may include more or fewer components, than the components illustrated in FIG. 1A.

In one or more embodiments, boundary 140 represents a boundary within which a minimum level of wireless coverage is desired to be achieved. In other words, boundary 140 represents a boundary of a wireless coverage area. Boundary 140 may be, for example, the walls or limits of a building, a room, a park, or another area. Boundary 140 is illustrated as a two-dimensional boundary for purposes of clarity and explanation, but may also be a three-dimensional boundary.

In one or more embodiments, network devices 110-118 and client devices 130-136 are wireless devices. Wireless devices include digital devices having functionality to transmit and/or receive information from each other without being connected by an electrical conductor. The functionality to wirelessly communicate may be implemented through, for example, an IEEE 802.11 wireless interface. The term "digital device" generally refers to any hardware device that includes a processor. A digital device may refer to a physical controller device or a hardware device executing a virtual controller.

Examples of wireless devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a controller, an access point, a wireless access point (WAP), a network device, and/or a client device.

In one or more embodiments, network devices 110-118 are wireless devices that provide access to one or more network resources to one or more other wireless devices (such as client devices 130-136). In an example, network devices 110-118 transmit and/or receive wireless signals based on IEEE 802.11 standards. Each of network devices 110-118 is associated with an identifier.

In an embodiment, network devices 110-118 are deployed within boundary 140. Network devices 110-118 are associated with wireless communication cell sizes 120-128. Wireless communication cell sizes 120-128 may be spherical or any other shape, depending on interference, environmental factors, or other factors affecting path loss. Each of wireless communication cell sizes 120-128 may be of a same or different size. Wireless communication cell sizes 120-128 include transmit cell sizes and/or receive cell sizes. A transmit cell size and a receive cell size are referred to herein as being "symmetric," if the transmit cell size and the receive cell size are the same. A transmit cell size and a receive cell size are referred to herein as being "asymmetric," if the transmit cell size and the receive cell size are not the same.

In an embodiment, a transmit cell size of a first wireless device determines a physical space within which a second wireless device would detect a wireless signal transmitted by the first wireless device, at or above a particular signal strength. In an example, network device 110 transmits a wireless signal at 25 dBm. The wireless signal dissipates or attenuates as the wireless signal propagates through space due to path loss. The wireless signal reaches the location of client device 130. At the location of client device 130, the signal strength of the wireless signal is reduced to −65 dBm. The location of client device 130 forms a part of the border of wireless communication cell size 120, which indicates a physical space within which a client device would detect a wireless signal, transmitted by network device 110, at or above −65 dBm.

In an embodiment, a receive cell size of a first wireless device determines a physical space within which a second wireless device transmits a wireless signal that would be detected by the first wireless device, at or above a particular signal strength. A receive cell size of a particular wireless device may be the same as or different from a transmit cell size of the particular wireless device. In an example, client device 130 transmits a wireless signal at 25 dBm. The wireless signal reaches network device 110 at −65 dBm. The location of client device 130 forms a part of the border of wireless communication cell size 120, which indicates a physical space within which a client device transmits a wireless signal that would be detected by network device 110, at or above −65 dBm.

In one or more embodiment, client devices 130-136 are wireless devices that are configured to connect to one or more network resources through one or more other wireless devices (such as network devices 110-118). Client devices 130-136 may be configured to receive, through the network resources, web traffic, voice data streams, video data streams, or any other type of data. In an example, client devices 130-136 transmit and/or receive wireless signals based on IEEE 802.11 standards. Each of client devices 130-136 is associated with an identifier.

In an embodiment, client devices 130-136 may be operated inside or outside boundary 140. As illustrated, client devices 130, 132, 136 are located inside boundary 140, and client device 134 is located outside boundary 140. Client device 134 is also referred as being located at an "edge" of the wireless coverage area encompassed by boundary 140.

In an embodiment, client devices 130-136 are associated with wireless communication cell sizes (not shown). Client devices 130-136 are associated with transmit cell sizes, indicating physical spaces in which a wireless device would detect wireless signals transmitted by client devices 130-136, at or above a particular signal strength. Client devices 130-136 are associated with receive cell sizes, indicating physical spaces in which a wireless device transmits wireless signals that would be detected by client devices 130-136, at or above a particular signal strength.

Figure 1B:
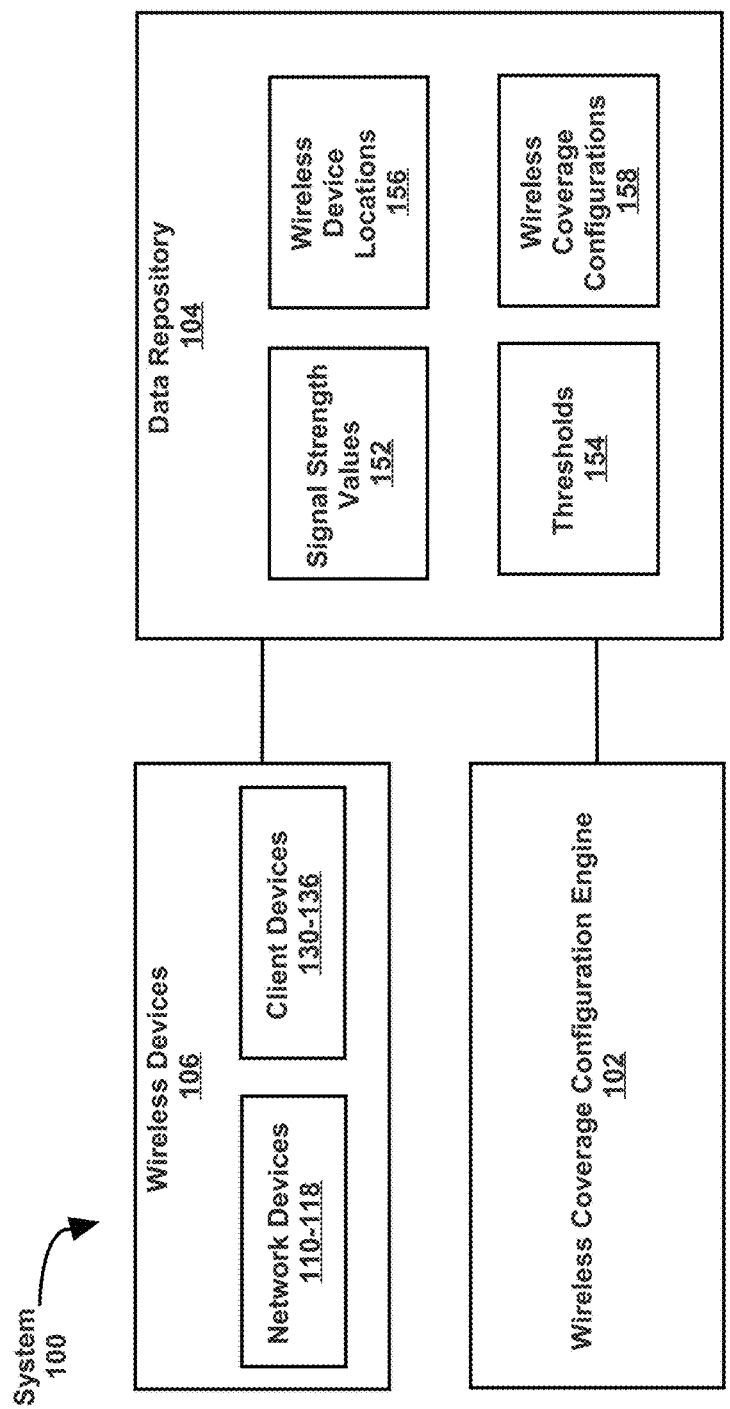
FIG. 1B shows a block diagram example of a system in accordance with one or more embodiments.

FIG. 1B shows a block diagram example of a system in accordance with one or more embodiments. Components in FIG. 1B that are the same as components in FIG. 1A are labeled with the same numbers. As illustrated in FIG. 1B, system 100 includes wireless devices 106 (including network devices 110-118 and client devices 130-136), wireless coverage configuration engine 102, and data repository 104. In one or more embodiments, system 100 may include more or fewer components, than the components illustrated in FIG. 1B. The components illustrated in FIG. 1B may be local to or remote from each other. The components illustrated in FIG. 1B may be implemented in software and/or hardware and may be distributed over one or more applications and/or machines. Operations described with respect to one component may instead be performed by another component.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be or may execute on the same computing system as wireless coverage configuration engine 102. Alternatively or additionally, data repository 104 may be on a separate computing system than wireless coverage configuration engine 102. Data repository 104 may be connected to wireless coverage configuration engine 102 via a direct connection or via a network. One or more signal strength values 152, one or more thresholds 154, one or more wireless device locations 156, and one or more wireless coverage configurations 158 may be implemented across any of components within system 100. However, these components are illustrated within data repository 104 for purposes of clarity and explanation.

In one or more embodiments, signal strength values 152 include signal strength values of wireless signals detected by wireless devices 106 (such as network devices 110-118 and client devices 130-136). Signal strength values 152 also include estimated signal strength values of wireless signals for wireless devices 106.

In one or more embodiments, one or more thresholds 154 are used to specify or define a desired level of wireless coverage. A desired level of wireless coverage is defined by one or more of the following criteria: (a) a minimum number of network devices are able to receive wireless signals from a client device at or above a threshold, and/or (b) a minimum number of network devices that transmit wireless signals that are able to be received by a client device at or above a threshold. In order for a wireless signal to satisfy criterion (a), a network device must both receive the wireless signal and receive the wireless signal at or above the threshold. In order for a wireless signal to satisfy criterion (b), a client device must both receive the wireless signal and receive the wireless signal at or above the threshold.

In an embodiment, a wireless signal is referred to as "received" by a particular wireless device if the wireless signal is detected at a signal strength at or above a receive sensitivity threshold set for the particular wireless device. Receive sensitivity threshold is an example of wireless coverage configurations 158, discussed below. In an embodiment, a wireless signal is referred to as "received" by a particular wireless device if the wireless signal is decodable by the particular wireless device. A wireless signal is decodable if the wireless device is able to process or interpret the data encoded on the wireless signal. If the signal strength at which a wireless signal reaches a wireless device is too low, then the wireless device would not be able to process or interpret the data encoded on the wireless signal.

In an embodiment, if a criterion, specified by a threshold, is not satisfied for a particular client device, then the location of the particular client device is referred to herein as a "wireless coverage hole," or a "coverage hole." In an embodiment, if a criterion, specified by a threshold, is not satisfied for a particular client device, additional samples are taken to determine whether the criterion remains unsatisfied. A location is not identified as a "coverage hole" until a sufficient number of data points indicate that a criterion is not satisfied.

In an embodiment, a threshold is a minimum signal strength. Thus a desired level of wireless coverage is defined by (a) a minimum number of network devices that receive wireless signals from a client device at or above a minimum signal strength, and/or (b) a minimum number of network devices that transmit wireless signals that are received by a client device at or above a minimum signal strength.

In an example, referring to FIG. 1A, network devices 110-118 are able to receive wireless signals at or above −75 dBm. A desired level of wireless coverage requires that a minimum of two network devices receive wireless signals from a client device at or above a minimum signal strength of −65 dBm. Wireless communication cell sizes 120-128 indicate physical spaces within which a wireless device may transmit a wireless signal that would be detected by network devices 110-118, at or above −65 dBm. Based on wireless communication cell sizes 120 and 126, two network devices (that is, network devices 110 and 116) receive wireless signals from client device 130 at or above −65 dBm. Thus the desired level of wireless coverage is achieved at the location of client device 130. Based on wireless communication cell sizes 122, 126, and 128, three network devices (that is, network devices 112, 116, and 118) receive wireless signals from client device 136 at or above −65 dBm. Thus the desired level of wireless coverage is achieved at the location of client device 136. Based on wireless communication cell size 124, one network device (that is, network device 114) receives wireless signals from client device 132 at or above −65 dBm. Thus the desired level of wireless coverage is not achieved at a location associated with client device 132. Network device 114 may be sampled over a period of time to determine whether the desired level of wireless coverage remains unsatisfied. Given a sufficient number of data points indicating that the desired level of wireless coverage is not achieved, a coverage hole is identified at the location associated with client device 132. Similarly, the desired level of wireless coverage is not achieved at a location associated with client device 134. Given a sufficient number of data points indicating that the desired level of wireless coverage is not achieved, a coverage hole is identified at the location associated with client device 134.

In an embodiment, a threshold is a minimum signal-to-noise ratio (SNR). SNR is a measure that compares the signal strength of a desired wireless signal to the noise floor. A noise floor is a level of background noise from external and/or internal noise sources. The presence of noise degrades the quality of wireless signals being received. A signal that reaches a wireless device at a signal strength that is close to or below the noise floor may not be detectable, receivable, and/or decodable by the wireless device. Based on a threshold that is a minimum SNR, a desired level of wireless coverage is defined by (a) a minimum number of network devices that receive wireless signals from a client device at or above a minimum SNR, and/or (b) a minimum number of network devices that transmit wireless signals that are received by a client device at or above a minimum SNR.

In an example, referring to FIG. 1A, network devices 110-118 are able to receive wireless signals at or above an SNR of 5 dB. A desired level of wireless coverage requires that a minimum of three network devices receive wireless signals from a client device at or above a minimum SNR of 10 dB. A noise floor detected at network device 112 is −80 dBm, a noise floor detected at network device 116 is −75 dBm, and a noise floor detected at network device 118 is −70 dBm. In order for a wireless signal detected by network device 112 to satisfy the minimum SNR, the wireless signal must be detected at or above −70 dBm (a difference of 10 dB from the noise floor of −80 dBm). In order for a wireless signal detected by network device 116 to satisfy the minimum SNR, the wireless signal must be detected at or above −65 dBm (a difference of 10 dB from the noise floor of −75 dBm). In order for a wireless signal detected by network device 118 to satisfy the minimum SNR, the wireless signal must be detected at or above −60 dBm (a difference of 10 dB from the noise floor of −70 dBm). A wireless signal transmitted by client device 136 is detected at network device 112 at −63 dBm, which satisfies the minimum SNR. A wireless signal transmitted by client device 136 is detected at network device 116 at −65 dBm, which satisfies the minimum SNR. A wireless signal transmitted by client device 136 is detected at network device 118 at −64 dBm, which does not satisfy the minimum SNR. Two network devices (that is, network devices 112 and 116) receive wireless signals from client device 136 at or above the minimum SNR of 10 dB. Thus the desired level of wireless coverage is not achieved at a location associated with client device 136. Given a sufficient number of data points indicating that the desired level of wireless coverage is not achieved, a coverage hole is identified at the location associated with client device 136.

In one or more embodiments, wireless device locations 156 include physical locations of wireless devices 106 and/or radio frequency (RF) locations of wireless devices 106.

In an embodiment, physical locations of wireless devices 106 may be specified in various ways, such as using coordinates in a coordinate system (for example, longitudinal and latitudinal coordinates, or (x, y, z) coordinates), an address, a position relative to a building (for example, a wing, floor, or room of a building), or a position relative to another object.

In an embodiment, physical locations of wireless devices 106 may be entered by a user or detected by a system (for example, a Global Positioning System (GPS)). Alternatively, physical locations of wireless devices 106 may be computed or estimated based on other data. In an example, a client device transmits a wireless signal at 30 dBm, and a network device detects the wireless signal at −40 dBm. A path loss model for the environment is known. Applying 30 dBm and −40 dBm to the pass loss model, the distance between the client device and the network device may be estimated.

In an embodiment, RF locations of wireless devices 106 are specified based on how well wireless devices 106 may communicate with each other. A RF location of a particular wireless device identifies one or more other wireless devices that may receive wireless signals transmitted by the particular wireless device, and specifies the signal strength at which the wireless signals are received. Additionally or alternatively, a RF location of a particular wireless device identifies one or more wireless devices transmitting wireless signals that may be received by the particular wireless device, and specifies the signal strength at which the wireless signals are received.

In an embodiment, RF locations of wireless devices 106 are specified relative to RF neighborhoods. A RF neighborhood refers to (a) a set of wireless devices that satisfy one or more criteria (as specified below), or (b) a geographical space that is within a RF communication range from at least one of the set of wireless devices. The set of wireless devices satisfy one or more criteria related to the RF communications range of the wireless devices, such as:

(a) each of the set of wireless devices is within a RF communications range from a particular wireless device;
(b) each of the set of wireless devices is within a particular number of hops from a particular wireless device;
(c) each of the set of wireless devices is within a RF communications range from all other wireless devices in the set of wireless devices; or
(d) each of the set of wireless devices is within a RF communications range from at least one other wireless device in the set of wireless device.

In an embodiment, a first device is within a RF communication range (referred to herein as "reachable") of a second device when a wireless signal transmitted by the second device at a certain transmit power is received by the first device at or above a signal strength threshold. The transmit power and signal strength threshold may be configured statically or dynamically for any system.

In an embodiment, a number of hops corresponds to a number of intermediary devices necessary for wireless communication between two devices. In an example, if a first device is within a RF communication range of a second device, zero intermediary devices are needed. If a first device and second device are not within a RF communication range of each other, but each is within a RF communication range of a third device, then the first device and second device are reachable via one intermediary device. A RF neighborhood may be defined by a set of wireless devices that are reachable from a particular wireless device via a particular number of intermediary devices.

In an embodiment, a physical environment may be partitioned into multiple RF neighborhoods that are each isolated from other RF neighborhoods. A RF neighborhood is isolated if the RF neighborhood is not reachable by at least one wireless device in another RF neighborhood. In another embodiment, a physical environment may be partitioned into multiple RF neighborhoods that overlap with each other. One wireless device may be associated with one or more RF neighborhoods.

In one or more embodiments, wireless coverage configurations 158 include configurations related to a RF communications range of a wireless device. Each of wireless devices 106 may be configured with different wireless coverage configurations 158.

In one or more embodiments, wireless coverage configurations 158 include transmit power. A transmit power is a power at which a wireless signal is transmitted from a wireless device. If a wireless signal is transmitted at a higher transmit power, then the wireless signal will attenuate to a particular signal strength over a farther distance.

In one or more embodiments, wireless coverage configurations 158 include a Modulation and Coding Scheme (MCS) index and/or Physical Layer (PHY) rate. A MCS index and/or PHY rate determines a data rate of a wireless connection between two or more wireless devices.

In an embodiment, a wireless signal transmitted at a particular data rate needs to reach a wireless device at or above a signal strength threshold in order to be received by the wireless device. A wireless signal transmitted at a higher data rate is associated with a higher signal strength threshold. That is, a wireless signal at a higher data rate needs to be detected by a wireless device at a higher signal strength, in order for the wireless signal to be received and decoded by the wireless device. If a wireless signal is transmitted at a lower MCS index and/or PHY rate, then the wireless signal would be able to be received over a farther distance.

In an embodiment, a network device is configured to apply a particular MCS index and/or PHY rate to transmit management frames. The MCS index and/or PHY rate may apply to all management frames of the network device. Alternatively, different MCS indexes and/or PHY rates may apply to management frames sent from the network device to different client devices.

In one or more embodiments, wireless coverage configurations 158 include a probe response threshold. A probe response threshold may be a signal strength threshold or a SNR threshold. If a wireless signal transmitted by a first device is received by a second device at or above the probe response threshold, then the wireless signal may initiate a wireless connection between the first wireless device and the second wireless device. The probe response threshold affects the ability of wireless devices farther away from each other to establish wireless connections.

In an example, a client device transmits probe signals at 45 dBm. A network device receives a probe signal at −30 dB. A probe response threshold for the network device is −40 dB. Since the probe signal is received at a signal strength higher than the probe response threshold, a wireless connection is established between the network device and the client device.

In an embodiment, if a probe response threshold of a particular wireless device is set to a lower value, then wireless signals that reach the particular wireless device at lower signal strengths may initiate a wireless connection with the particular wireless device.

Wireless signals that reach the particular wireless device at lower signal strengths may include wireless signals that are transmitted from wireless devices located farther away from the particular wireless device.

In one or more embodiments, wireless coverage configurations 158 include a disconnect threshold. A disconnect threshold may be a signal strength threshold or a SNR threshold. If a wireless signal transmitted by a first device is received by a second device below the disconnect threshold, then a wireless connection between the first wireless device and the second wireless device is disconnected. The disconnect threshold affects the ability of wireless devices farther away from each other to maintain wireless connections.

In an example, a client device transmits wireless signals at 45 dBm. A network device, connected to the client devices, receives a wireless signal at −70 dB. A disconnect threshold for the network device is −65 dB. Since the wireless signal is received at a signal strength lower than the disconnect threshold, the wireless connection between the network device and the client device is disconnected.

In an embodiment, if a disconnect threshold of a particular wireless device is set to a lower value, then wireless signals that reach the particular wireless device at lower signal strengths may be used to maintain a wireless connection with the particular wireless device. Wireless signals that reach the particular wireless device at lower signal strengths may include wireless signals that are transmitted from wireless devices located farther away from the particular wireless device.

In one or more embodiments, wireless coverage configurations 158 include receive sensitivity. Receive sensitivity indicates a threshold above which a wireless signal is received by a wireless device. The threshold may be a signal strength threshold or a SNR threshold. If the receive sensitivity for a particular wireless device is set to a lower value, then wireless signals that reach the particular wireless device at lower signal strengths may be received by the particular wireless device. Wireless signals that reach the particular wireless device at lower signal strengths may include wireless signals transmitted from wireless devices located farther away from the particular wireless device.

In an embodiment, a receive sensitivity of a wireless device is configured to be below a noise floor detected at the wireless device. In this case, whether a wireless signal is received by the wireless device is limited by the noise floor, rather than the receive sensitivity. Reducing the receive sensitivity would not cause the wireless device to receive wireless signals at lower signal strengths.

In one or more embodiments, wireless coverage configurations 158 include receive gain. Receive gain indicates an amplification performed by a wireless device on a wireless signal that is detected by the wireless device. Receive gain may be implemented through RF circuitry of the wireless device. If the receive gain for a particular wireless device is set to a higher value, then wireless signals that reach the particular wireless device at lower signal strengths may be received by the particular wireless device. Wireless signals that reach the particular wireless device at lower signal strengths may include wireless signals transmitted from wireless devices located farther away from the particular wireless device.

In one or more embodiments, the above examples of wireless coverage configurations 158 is a non-exhaustive list of configurations that adjust a transmit cell size and/or a receive cell size, such as wireless communication cell sizes 120-128 in FIG. 1A.

In an example, a transmit power of a wireless device is increased. As described above, if a wireless signal is transmitted at a higher transmit power, then the wireless signal will attenuate to a particular signal strength over a farther distance. The higher transmit power increases the transmit cell size of the wireless device.

In an example, a MCS index of a wireless device is reduced. As described above, if a wireless signal is transmitted at a lower MCS index, then the wireless signal will be able to be received over a farther distance. The lower MCS index increases the transmit cell size of the wireless device.

In an example, a receive sensitivity of a wireless device is decreased. As described above, if the receive sensitivity for a particular wireless device is set to a lower value, then wireless signals transmitted from wireless devices located farther away from the particular wireless device may be received by the particular wireless device. The lower receive sensitivity increases the receive cell size of the wireless device.

In an example, a receive gain of a wireless device is increased. As described above, if the receive gain for a particular wireless device is set to a higher value, then wireless signals transmitted from wireless devices located farther away from the particular wireless device may be received by the particular wireless device. The higher receive gain increases the receive cell size of the wireless device.

In one or more embodiments, wireless coverage configurations 158 include radio frequency (RF) channel. A RF channel is a particular range of frequencies. A RF channel may be, for example, one of the fourteen channels in the IEEE 802.11 2.4 GHz band. In an example, a wireless device has functionality to operate in multiple RF channels, which may overlap with each other or be independent of each other. The wireless device may operate in only one RF channel at any one time, which is referred to herein as the "current operating channel" or "home channel." In order for two wireless devices to wirelessly communicate, the wireless devices need to operate in the same channel. In an example, a wireless signal transmitted from a first device operating in a first channel is not received by a second device operating in a second channel. The RF channel of the first device is then modified to the second channel. Another wireless signal transmitted from the first device, now operating in the second channel, may be received by the second device.

In one or more embodiments, wireless coverage configurations 158 include the addition or movement of one or more network devices. In an example, wireless signals transmitted by a client device is received by two network devices at or above a threshold. By adding a third network device at a location associated with the client device, wireless signals transmitted by the client device are now received by three network devices at or above the threshold.

In one or more embodiments, wireless coverage configuration engine 102 refers to hardware and/or software configured to perform operations described herein for determining adaptive wireless coverage configurations. In an example, wireless coverage configuration engine 102 is the same as or implemented on a same device as one or more of wireless devices 106. In another example, wireless coverage configuration engine 102 is implemented on a separate device from wireless devices 106, such as at a controller and/or a server located in a cloud computing environment. Examples of operations performed by the wireless coverage configuration engine 102 are described below with references to FIG. 2.

C. Determining Adaptive Wireless Coverage Configurations

Figure 2:
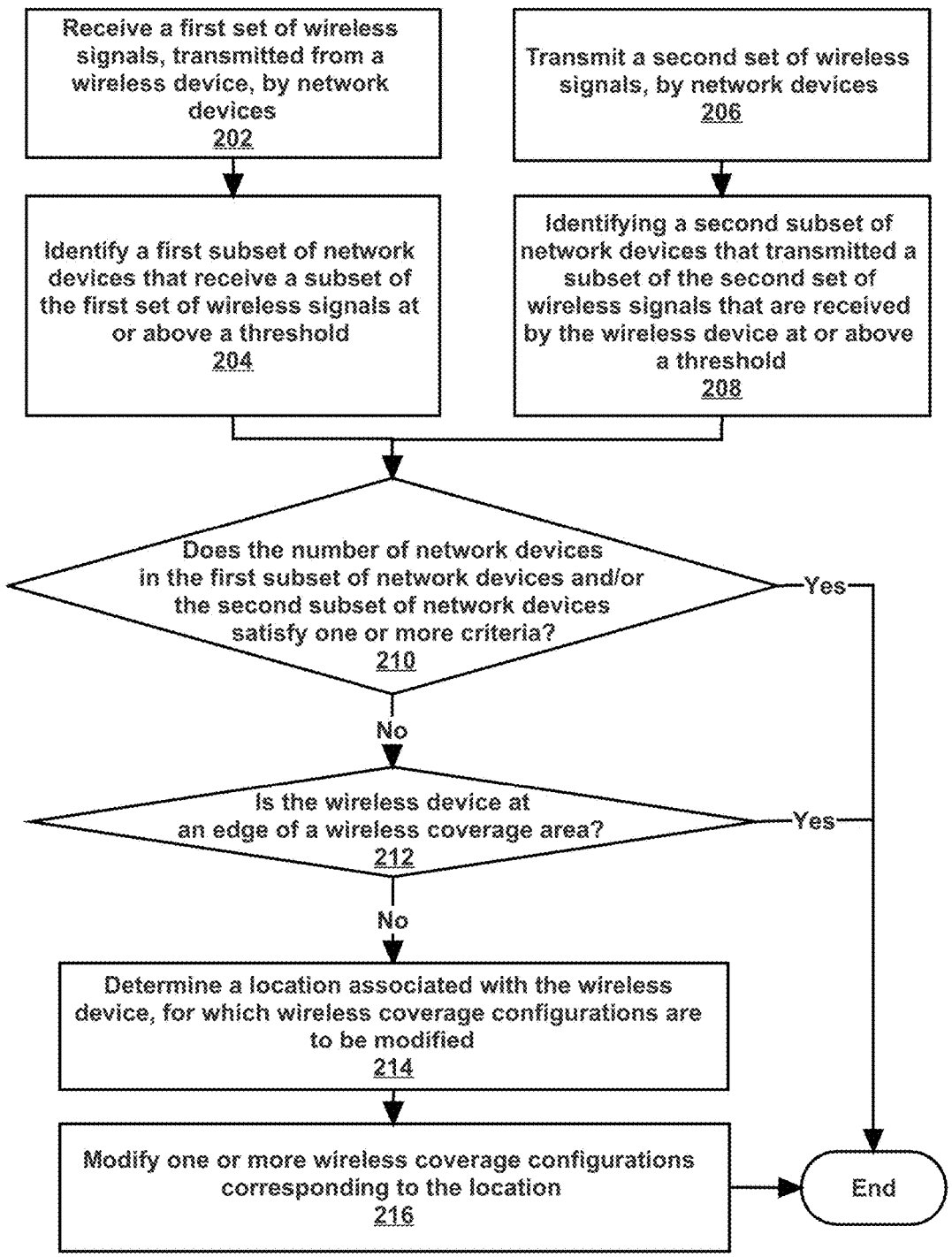
FIG. 2 shows an example set of operations for determining adaptive wireless coverage configurations in accordance with one or more embodiments.

FIG. 2 illustrates an example set of operations for determining adaptive wireless coverage configurations in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In one or more embodiments, Operations 202-204 and/or Operations 206-208 are performed depending on the definition of a desired level of wireless coverage. In an example, a desired level of wireless coverage is that a minimum number of network devices receive wireless signals from a wireless device at or above a threshold. Then, Operations 202-204 would be performed. In another example, a desired level of wireless coverage is that a minimum number of network devices transmit wireless signals that are received by a wireless device at or above a threshold. Then, Operations 206-208 would be performed. In another example, a desired level of wireless coverage is a combination of the two examples above. The desired level of wireless coverage is that (a) a minimum number of network devices receive wireless signals from a wireless device at or above a threshold, and (b) a minimum number of network devices transmit wireless signals that are received by a wireless device at or above a threshold. Then, Operations 202-208 would be performed.

In one or more embodiments, a first set of wireless signals, transmitted from a wireless device, are received by one or more network devices (Operation 202). A wireless device transmits a first set of wireless signals. Each wireless signal is encoded with information identifying the source of the wireless signal. In an example, a wireless device transmits a wireless signal encoded with an identifier of the wireless device.

In an embodiment, one or more network devices detect the first set of wireless signals using particular wireless coverage configurations. The particular wireless coverage configurations may include a particular receive sensitivity, a particular receive gain, and/or other settings. Based on a particular receive gain of a network device, the network device detects a wireless signal at a particular signal strength. Based on a particular receive sensitivity of a network device, the network device is able to receive a wireless signal that is detected at a particular signal strength.

In an embodiment, after a network device receives a wireless signal, the network device decodes the wireless signal to determine a source of the wireless signal. In an example, the network device decodes the wireless signal to determine an identifier of the wireless device that transmitted the wireless signal. All network devices that receive wireless signals from a same wireless device are identified.

In one or more embodiments, a first subset of network devices that receive a subset of the first set of wireless signals at or above a threshold are identified (Operation 204). The threshold may be a signal strength threshold or a SNR threshold. The threshold value is determined based on the desired level of wireless coverage. In an example, a desired level of wireless coverage is that a minimum number of network devices receive wireless signals transmitted from a particular wireless device at or above −70 dBm. Then, the network devices that receive a subset of the wireless signals at or above −70 dBm are identified.

Continuing the example, a first network device receives a wireless signal from the particular wireless device at −60 dBm. A second network device receives a wireless signal from the particular wireless device at −80 dBm. Then, the first network device is identified in the subset of network devices that receive wireless signals from the particular wireless device at or above a threshold of −70 dBm. The second network device is not identified in the subset of network devices.

In one or more embodiments, a second set of wireless signals are transmitted by one or more network devices (Operation 206). A network device transmits a second set of wireless signals. Each wireless signal is encoded with information identifying the source of the wireless signal. In an example, a network device transmits a wireless signal encoded with an identifier of the network device.

In an embodiment, one or more network devices transmit the second set of wireless signals using particular wireless coverage configurations. The particular wireless coverage configurations may include a particular transmit power, a particular MCS index and/or PHY rate, and/or other settings. Based on the particular transmit power of a network device, the network device transmits wireless signals that attenuate to a certain signal strength at a certain distance away from the network device. Based on the MCS index and/or PHY rate, the network device transmits wireless signals that are able to be decoded when received at or above a certain signal strength.

In one or more embodiments, a subset of the second set of wireless signals are received by the wireless device at or above a threshold. The network devices that transmitted the subset of the second set of wireless signals are identified (Operation 208). The threshold may be a signal strength threshold or a SNR threshold. The threshold value is determined based on the desired level of wireless coverage. In an example, a desired level of wireless coverage is that a minimum number of network devices transmit wireless signals that are received by a particular wireless device at or above −70 dBm. Then, the network devices that transmit wireless signals that are received by the particular wireless device at or above −70 dBm are identified.

In an embodiment, whether a wireless signal is received by the wireless device at or above a threshold is determined based on reports transmitted by the wireless device. A report identifies the wireless signals that have been received by the wireless device, and the signal strengths at which the wireless signals were received. The report may be broadcasted by the wireless device to multiple other devices, or the report may be addressed to one or more specific network devices or wireless devices.

In an example, a desired level of wireless coverage is that a minimum number of network devices transmit wireless signals that are received by a particular wireless device at or above −70 dBm. A first wireless device transmits a first wireless signal, a second wireless device transmits a second wireless signal, and a third wireless device transmits a third wireless signal. A wireless device broadcasts a report of the wireless signals received by the wireless device. The report provides that the first wireless signal is received by the wireless device at −50 dBm, the second wireless signal is received by the wireless device at −55 dBm, and the third wireless signal is received by the wireless device at −75 dBm. The report is received by the first network device. Then, the first network device and the second network device are identified in the subset of network devices that transmit wireless signals that are received by the particular wireless device at or above −70 dBm. The third network device is not identified in the subset of network devices.

In an embodiment, whether a wireless signal is received by the wireless device at or above a threshold is determined based on estimated signal strengths. An estimated signal strength value, at a target device, for a wireless signal transmitted by a network device, is determined based on a signal strength value, detected by the network device, for a wireless signal transmitted by the target device.

In an example, a target device transmits a first wireless signal at 40 dBm. A network device detects the first wireless signal at −20 dBm. A relationship between the transmit power of a wireless signal transmitted by the target device and the signal strength of the wireless signal received by the network device is determined. The network device then transmits a second wireless signal at 30 dBm. Based on the relationship, and the transmit power of the network device at 30 dBm, an estimated signal strength of the second wireless signal at the target device is estimated. Some examples of estimating signal strength values are also described in U.S. patent application Ser. No. 14/788,310, filed Jun. 30, 2015, titled "Estimating Signal Strength at a Target Device," which is hereby incorporated by reference.

In an embodiment, whether a wireless signal is received by the wireless device at or above a threshold is determined based on data rates used to sustain a wireless connection with the wireless device. As described above, a wireless signal, transmitted by a first wireless device at a particular data rate, needs to be received by a second wireless device at or above a particular signal strength, in order for the second wireless device to decode the wireless signal. If a wireless device is unable to decode a wireless signal transmitted at a particular data rate, then the wireless signal was received at a signal strength that is lower than the signal strength required for decoding the wireless signal at the particular data rate.

In an example, a wireless device is able to decode a wireless signal transmitted at MCS 0 if the wireless signal is received at or above −70 dBm. The wireless device is able to decode a wireless signal transmitted at MCS 1 if the wireless signal is received at or above −60 dBm. A network device sustains a wireless connection with the wireless device at MCS 0. However, the network device is unable to sustain a wireless connection with the wireless device at MCS 1. Hence, a wireless signal transmitted by the network device is determined to be received at the wireless device at a signal strength between −60 dBm and −70 dBm.

In one or more embodiments, an inquiry is made as to whether the number of network devices in the first subset of network devices and/or the number of network devices in the second subset of network devices satisfy one or more criteria (Operation 210). The criteria are determined based on the desired level of wireless coverage.

In an example, a desired level of wireless coverage is that a minimum of n network devices receive wireless signals from a wireless device at or above a threshold. Then a criterion is that n or more network devices are in the first subset of network devices.

In an example, a desired level of wireless coverage is that a minimum of m network devices transmit wireless signals that are received by a wireless device at or above a threshold. Then a criterion is that m or more network devices are in the second subset of network devices.

In an example, a desired level of wireless coverage is that (a) a minimum of n network devices receive wireless signals from a wireless device at or above a threshold, and (b) a minimum of m network devices transmit wireless signals that are received by a wireless device at or above a threshold. Then the criteria are that (a) n or more network devices are in the first subset of network devices, and (b) m or more network devices are in the second subset of network devices.

In an example, a desired level of wireless coverage is based on a sum of (a) the number of network devices that receive wireless signals from a wireless device at or above a threshold and (b) the number of network devices that transmit wireless signals that are received by a wireless device at or above a threshold. The desired level of wireless coverage is that the sum is greater than a minimum of p network devices. Then a criterion is that the sum of (a) the number of network devices in the first subset of network devices and (b) the number of network devices in the second subset of network devices is greater than p.

In one or more embodiments, if the criteria are satisfied, then the process ends. The desired level of wireless coverage has been achieved.

In one or more embodiments, if the criteria are not satisfied, then an inquiry is made as to whether the wireless device is located at an edge of a wireless coverage area (Operation 212). Whether a wireless device is located at an edge of a wireless coverage area may be determined using physical location and/or RF location.

In an embodiment, a physical location of the wireless device is determined, and then compared with the physical location of an edge of the wireless coverage area. In an example, the physical location of the wireless device is determined to be at latitude 37.8° N, and longitude 122.4° W. A physical location of a wireless coverage area is determined to be within latitude 34.6° N and 37.7° N, and longitude 120.0° W and 122.3° W. The physical location of the wireless device is outside of the wireless coverage area. Hence, the wireless device is determined to be at an edge of the wireless coverage area.

In an embodiment, an RF location of an edge of the wireless coverage area is determined using association/disassociation of client devices. In an example, client devices entering a wireless coverage area through an entrance way (such as a door) connect to the wireless network by associating with a network device associated with the entrance way. Client devices exiting the wireless coverage area through the entrance way disconnect from the wireless network by disassociating from a network device associated with the entrance way. Historical data relating to the association/disassociation at a particular network device is stored and analyzed. If associations/disassociations at the particular network device is correlated with a connection/disconnection with the wireless network, then the particular network device is determined to be at an edge of a wireless coverage area.

In an embodiment, an RF location of an edge of the wireless coverage area is determined using the roaming patterns of client devices. In an example, a particular network device is located near a wall of a wireless coverage area. When client devices approach the particular network device, the client devices associate with the particular network device, and disassociate with one of a limited subset of network devices. When client devices move away from the particular network device, the client devices disassociate with the particular network device, and associate with one of the limited subset of network devices. Based on the limited roaming pattern, the particular network device is determined to be at an edge of a wireless coverage area.

In an embodiment, a RF location of a wireless device, relative to the edge of the wireless coverage area, is determined. In an example, a RF location of a wireless device indicates that the wireless device is within RF communication range of a particular network device that is at an edge of a wireless coverage area. The wireless device is not in RF communication range of any other network devices. Then, the wireless device is determined to be located at an edge of the wireless coverage area. In another example, a RF location of a wireless device indicates that all network devices in the same RF neighborhood are at an edge of a wireless coverage area. Then, the wireless device is determined to be located at an edge of the wireless coverage area.

In one or more embodiments, if the wireless device is located at an edge of the wireless coverage area, then the process ends. The desired level of wireless coverage need not be achieved for the wireless device located at the edge of the wireless coverage area.

In one or more embodiments, if the wireless device is not located at an edge of the wireless coverage area, then the location of the wireless device is determined to be a coverage hole. The location of the wireless device, and/or another location associated with the wireless device, is determined as a location for which wireless coverage configurations are to be modified (Operation 214). A physical location and/or RF location associated with the wireless device may be determined.

In an embodiment, a location associated with the wireless device, for which wireless coverage configurations are to be modified, is determined based on the locations of multiple coverage holes. In an example, a first coverage hole is located at a first physical location, and a second coverage hole is located at a second physical location. A mid-point of the first location and the second location is determined as a third physical location. The third physical location is determined to be a location for which wireless coverage configurations are to be modified. In another example, a first coverage hole is located at a first RF location, and a second coverage hole is located at a second RF location. A third RF location that is within RF communication range of both the first RF location and the second RF location, is determined to be a location for which wireless coverage configurations are to be modified.

In one or more embodiments, one or more wireless coverage configurations corresponding to the location determined at Operation 214 are modified (Operation 216). In an embodiment, one or more network devices, for which wireless coverage configurations are to be modified, are identified. Then, the specific wireless coverage configurations to be modified are determined.

In an embodiment, a first subset of network devices that receive wireless signals from a wireless device at or above a threshold are identified, as described at Operation 204. A second subset of network devices that transmit wireless signals that are received by the wireless device at or above a threshold are identified, as described at Operation 208. A network device for which wireless coverage configurations are to be modified is selected from a subset of network devices that are not in the first subset of network devices and/or that are not in the second subset of network devices. That is, the network device for which wireless coverage configurations are to be modified is a network device that does not receive wireless signals from the wireless device at or above a threshold. Additionally or alternatively, the network device for which wireless coverage configurations are to be modified is a network device that does not transmit wireless signals that are received by the wireless device at or above a threshold.

In an embodiment, one or more network devices, for which wireless coverage configurations are to be modified, are determined based on physical location. In an example, network devices within a physical distance from the location determined at Operation 214 are identified. In another example, one or more network devices that are physically closest to the location determined at Operation 214 are identified.

In an embodiment, one or more network devices, for which wireless coverage configurations are to be modified, are determined based on RF location. In an example, network devices that would be within RF communication range of a wireless device placed at the location determined at Operation 214 are determined. In another example, network devices that are within a same RF neighborhood as the location determined at Operation 214 are identified.

In an embodiment, one or more specific wireless coverage configurations to be modified are determined based on what criteria were determined to be not satisfied at Operation 210. In an embodiment, the number of network devices that receive wireless signals from a wireless device at or above a threshold is determined to be insufficient. Receive sensitivity, receive gain, and/or other wireless coverage configurations that affect a receive cell size may be modified.

In an example, a desired level of wireless coverage is that at least three network devices receive wireless signals from a wireless device at or above a threshold of −60 dBm. A first wireless device receives a wireless signal from the wireless device at −50 dBm. A second wireless device receives a wireless signal from the wireless device at −55 dBm. A third wireless device receives a wireless signal from the wireless device at −65 dBm. The receive gain of the third wireless device is modified such that the third wireless device applies a greater amplification on detected wireless signals. The third wireless device then receives a wireless signal from the wireless device at −60 dBm. Thus, the desired level of wireless coverage is achieved by modifying a receive gain.

In an example, a desired level of wireless coverage is that at least three network devices receive wireless signals from a wireless device at or above a threshold of −60 dBm. A first wireless device receives a wireless signal from the wireless device at −50 dBm. A second wireless device receives a wireless signal from the wireless device at −55 dBm. A third wireless device does not receive any wireless signals from the wireless device. The receive sensitivity of the third wireless device is modified from −50 dBm to −60 dBm. The third wireless device then receives a wireless signal from the wireless device at −60 dBm. Thus, the desired level of wireless coverage is achieved by modifying a receive sensitivity.

In an example, when modifying wireless coverage configurations that affect a receive cell size, wireless coverage configurations that affect a transmit cell size are also modified. The wireless coverage configurations are modified such that the receive cell size and the transmit cell size are symmetric and/or balanced.

In an embodiment, the number of network devices that transmit wireless signals that are received by a wireless device at or above a threshold is determined to be insufficient. Transmit power, a MCS index or PHY rate, and/or other wireless coverage configurations that affect a transmit cell size may be modified.

In an example, a desired level of wireless coverage is that at least three network devices transmit wireless signals that are received by a wireless device at or above a threshold of −60 dBm. A first network device transmits a first wireless signal. A second network device transmits a second wireless signal. A third network device transmits a third wireless signal. A wireless device receives the first wireless signal at −50 dBm, the second wireless signal at −55 dBm, and the third wireless signal at −65 dBm. The transmit power of the third network device is increased. The wireless device then receives a wireless signal, transmitted by the third network device, at −60 dBm. Thus, the desired level of wireless coverage is achieved by modifying a transmit power.

In an example, a desired level of wireless coverage is that at least three network devices transmit wireless signals that are received by a wireless device at or above a threshold of −60 dBm. A first network device transmits a first wireless signal. A second network device transmits a second wireless signal. A third network device transmits a third wireless signal. A wireless device receives the first wireless signal at −50 dBm, and the second wireless signal at −55 dBm. The wireless device does not receive the third wireless signal. While the wireless device may detect wireless signals from the third network device, the wireless device is unable to decode the wireless signals and therefore unable to determine that the wireless signals are being transmitted by the third network device. The MCS index of the third network device is reduced. Due to a decrease in the data rate, wireless signals from the third network device, reaching the wireless device at the same signal strength, are now decodable by the wireless device. The wireless device receives a wireless signal from the third network device at −60 dBm. Thus, the desired level of wireless coverage is achieved by modifying an MCS index.

In an example, when modifying wireless coverage configurations that affect a transmit cell size, wireless coverage configurations that affect a receive cell size are also modified. The wireless coverage configurations are modified such that the receive cell size and the transmit cell size are symmetric and/or balanced.

In an embodiment, a wireless device and a network device are operating in different RF channels. Thus, the network device does not receive a wireless signal transmitted by the wireless device. Additionally or alternatively, the wireless device does not receive a wireless signal transmitted by the network device. The RF channel of the network device may be modified.

In an example, a desired level of wireless coverage is that a minimum of three network devices receive wireless signals from a wireless device at or above a threshold of −70 dBm. A wireless device operates in a first RF channel. A first network device receives a wireless signal from the wireless device at −50 dBm, in the first RF channel. A second network device receives a wireless signal from the wireless device at −55 dBm, in the first RF channel. A third network device, operating in a second RF channel, is unable to receive any wireless signals transmitted by the wireless device. The operating channel of the third network device is modified to the first RF channel. The third network device then receives a wireless signal from the wireless device at −40 dBm. Thus, the desired level of wireless coverage is achieved by modifying the RF channel.

In an embodiment, one or more additional network devices are added to a wireless coverage area, in order to achieve a desired level of wireless coverage area. Additional network devices may be added if the density of network devices is insufficient. Additionally or alternatively, additional network devices may be added if the existing network devices are already set to a maximum desired wireless communication cell size.

D. Example Embodiments

Figure 3A:
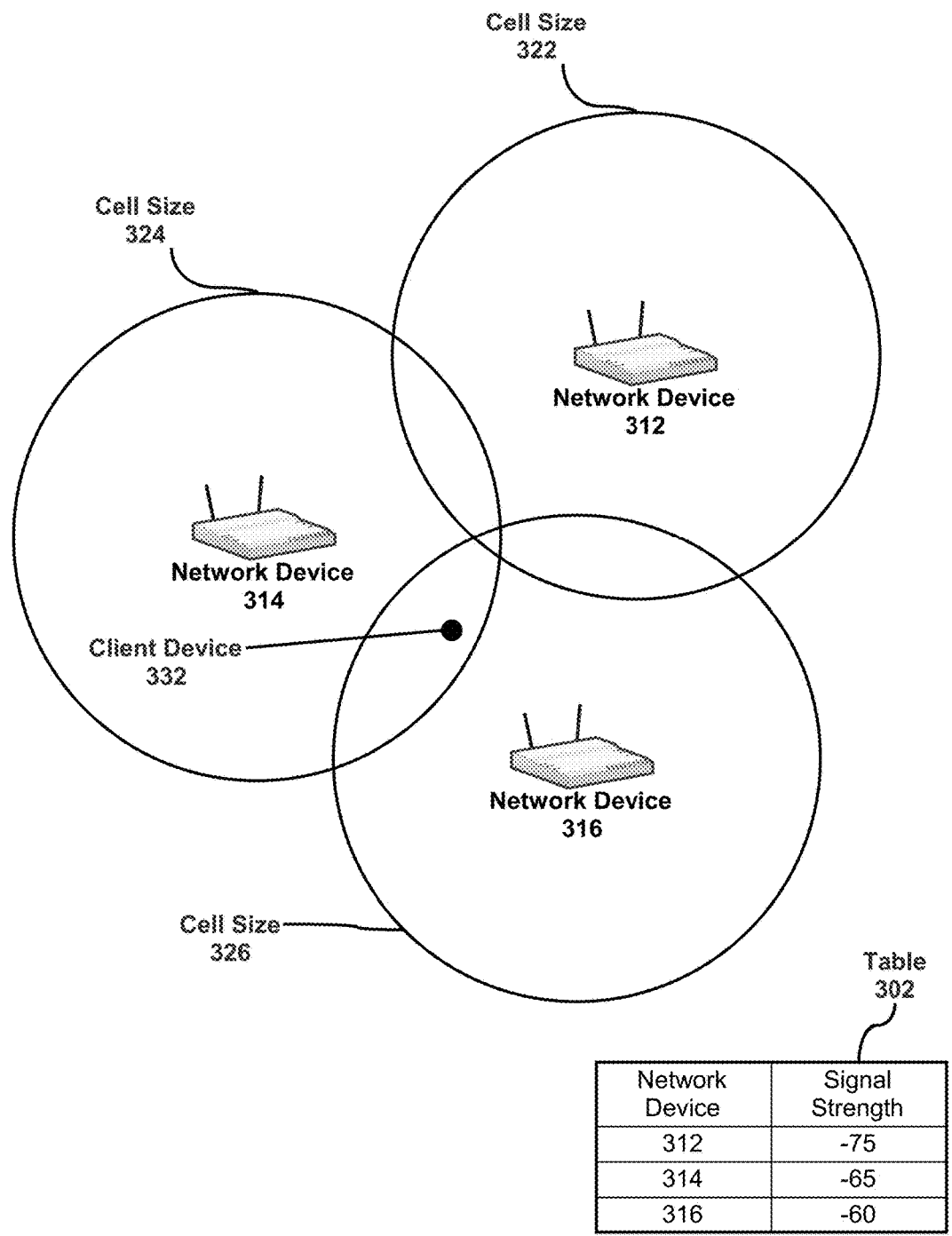
FIGS. 3A-3C illustrates examples of determining adaptive wireless coverage configurations in accordance with one or more embodiments.
Figure 3B:
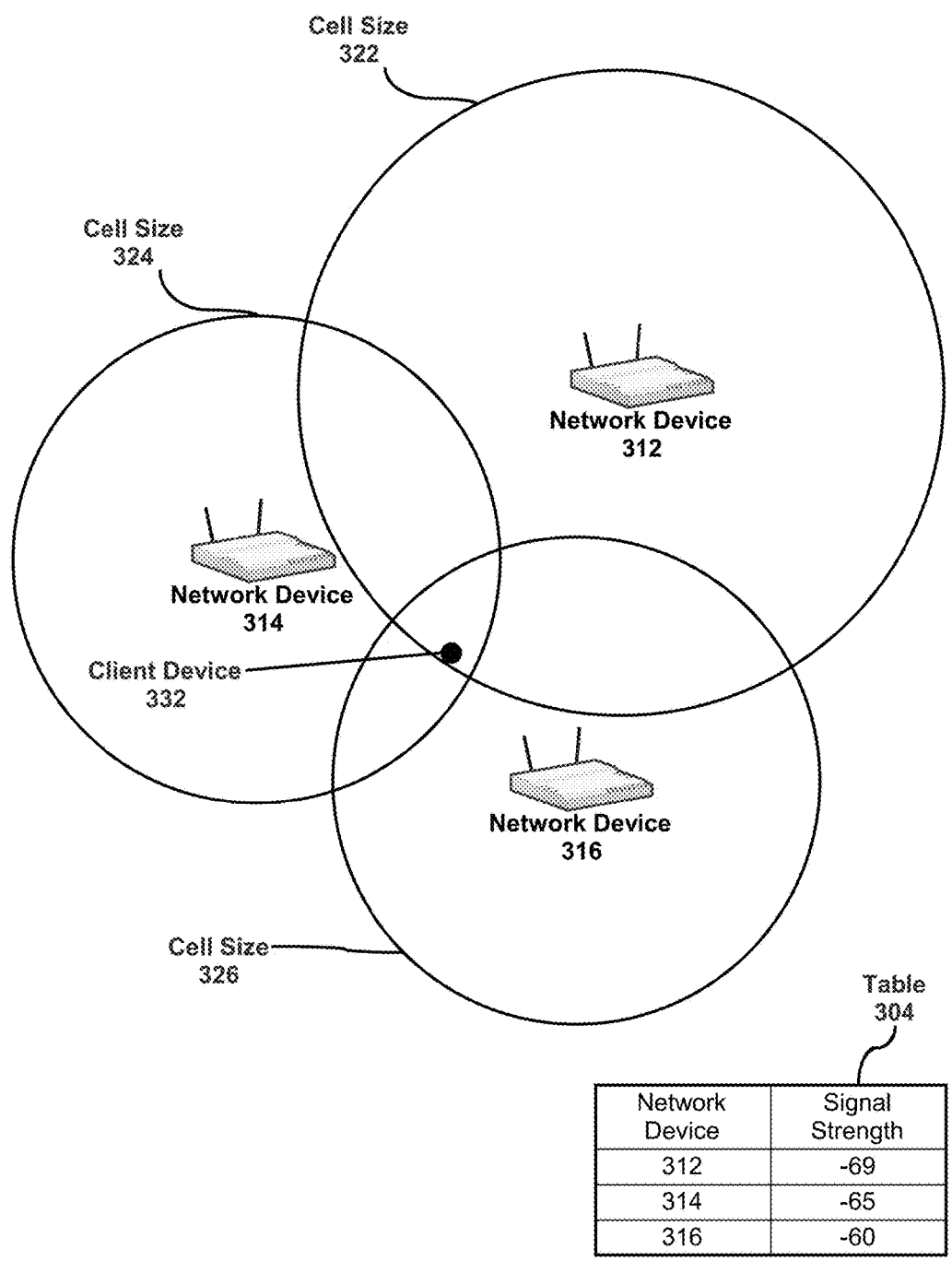
Figure 3C:
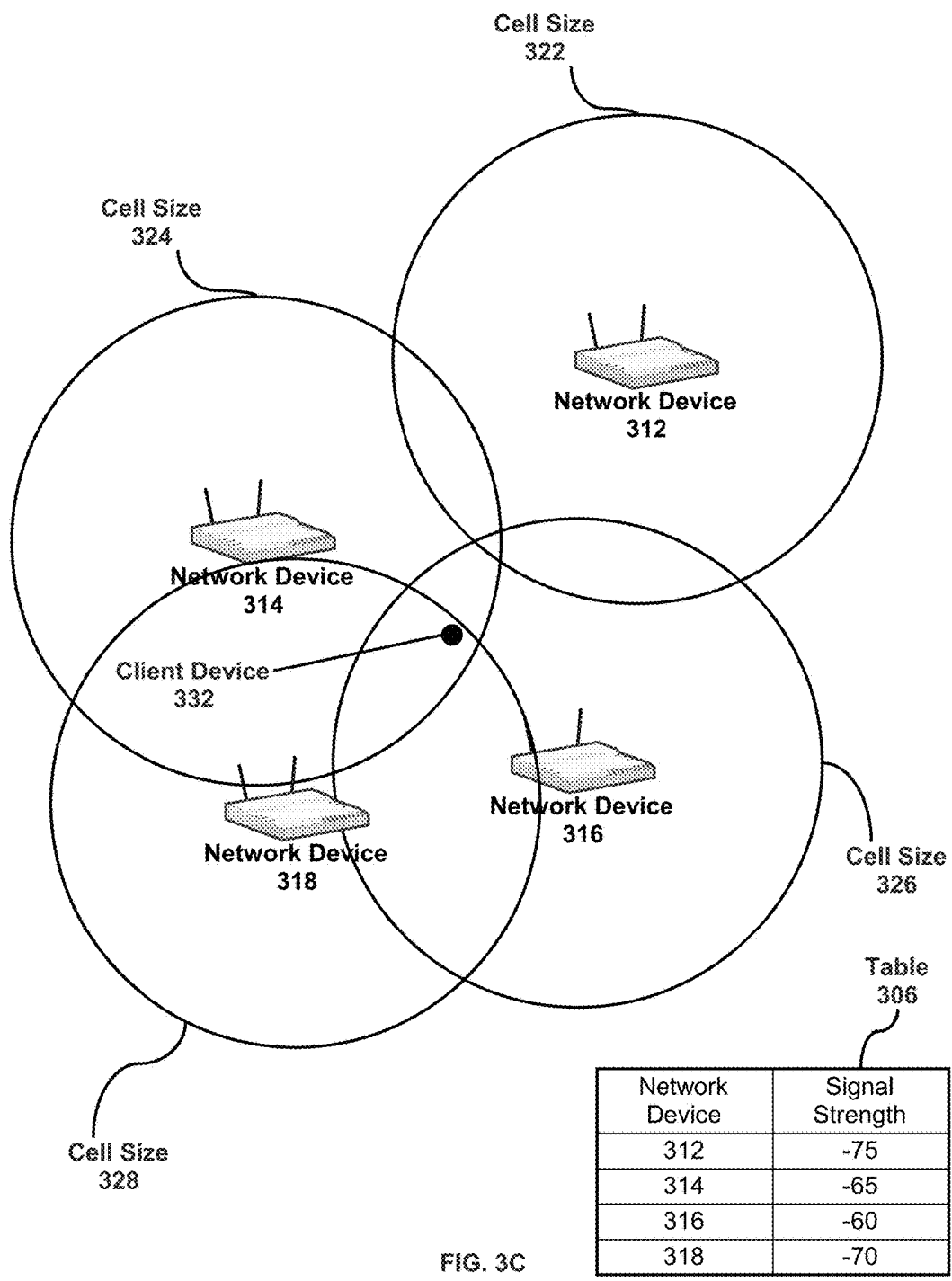

FIGS. 3A-3C illustrates examples of determining adaptive wireless coverage configurations in accordance with one or more embodiments. Detailed examples are described below for purposes of clarity. Components and/or operations described below should be understood as one specific example which may not be applicable to certain embodiments. Accordingly, components and/or operations described below should not be construed as limiting the scope of any of the claims. Features, components, and/or operations described with regard to this example embodiment are not necessarily applicable to other embodiments.

In an example, a desired level of wireless coverage is that a minimum of three network devices transmit wireless signals that are received at a client device at or above a threshold of −70 dBm.

As illustrated in FIG. 3A, the desired level of wireless coverage is initially not achieved in the wireless coverage area. Network devices 312-316 are deployed in the wireless coverage area. Cell sizes 322-326 represent transmit cell sizes of network devices 312-316, respectively. Cell size 322 indicates an area in which a client device would receive wireless signals transmitted by network devices 312 at or above −70 dBm. Cell size 324 indicates an area in which a client device would receive wireless signals transmitted by network devices 314 at or above −70 dBm. Cell size 326 indicates an area in which a client device would receive wireless signals transmitted by network devices 316 at or above −70 dBm.

Client device 332 is operating in the wireless coverage area. Client device 332 is within cell size 324 and cell size 326, but outside of cell size 322. Based on cell size 324, client device 332 receives a wireless signal from network device 314 at or above −70 dBm. Based on cell size 326, client device 332 receives a wireless signal from network device 316 at or above −70 dBm. Based on cell size 322, client device 332 does not receive a wireless signal from network device 312 at or above −70 dBm.

Table 302 indicates the respective signal strengths of wireless signals received at client device 332. Client device 332 receives a wireless signal from network device 312 at −75 dBm. Client device 332 receives a wireless signal from network device 314 at −65 dBm. Client device 332 receives a wireless signal from network device 316 at −60 dBm.

Only two network devices (network devices 314-316) transmit wireless signals that are received at client device 332 at or above the threshold of −70 dBm. The desired level of wireless coverage is that a minimum of three network devices transmit wireless signals that are received at client device 332 at or above −70 dBm. Therefore, the desired level of wireless coverage is not achieved.

As illustrated in FIG. 3B, one way of achieving the desired level of wireless coverage is to modify the transmit power of network device 312. The transmit power of network device 312 is increased. Thus, cell size 322 is increased. Prior to the increase, a wireless signal transmitted by network device 312 attenuated to −70 dBm at a certain distance away from network device 312. After the increase, a wireless signal transmitted by network device 312 attenuates to −70 dBm at a farther distance away from network device 312. After the increase, client device 332 is located within cell size 322. Client device 332 receives a wireless signal from network device 312 at or above −70 dBm.

Table 304 indicates the respective signal strengths of wireless signals received at client device 332. Client device 332 receives a wireless signal from network device 312 at −69 dBm. Client device 332 receives a wireless signal from network device 314 at −65 dBm. Client device 332 receives a wireless signal from network device 316 at −60 dBm.

Three network devices (network devices 312-316) transmit wireless signals that are received at client device 332 at or above the threshold of −70 dBm. Therefore, the desired level of wireless coverage is achieved.

As illustrated in FIG. 3C, another way of achieving the desired level of wireless coverage is to add an additional network device 318. Network device 318 is added to the wireless coverage area after determining that cell sizes 322-326 are already set to a maximum desired size.

Network device 318 is associated with cell size 328. Cell size 328 indicates an area in which a client device would receive wireless signals transmitted by network devices 318 at or above −70 dBm. Client device 332 is located within cell size 322. Client device 332 receives a wireless signal from network device 312 at or above −70 dBm Table 306 indicates the respective signal strengths of wireless signals received at client device 332. Client device 332 receives a wireless signal from network device 312 at −75 dBm. Client device 332 receives a wireless signal from network device 314 at −65 dBm. Client device 332 receives a wireless signal from network device 316 at −60 dBm. Client device 332 receives a wireless signal from network device 318 at −70 dBm.

Three network devices (network devices 314-318) transmit wireless signals that are received at client device 332 at or above the threshold of −70 dBm. Therefore, the desired level of wireless coverage is achieved.

E. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

F. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
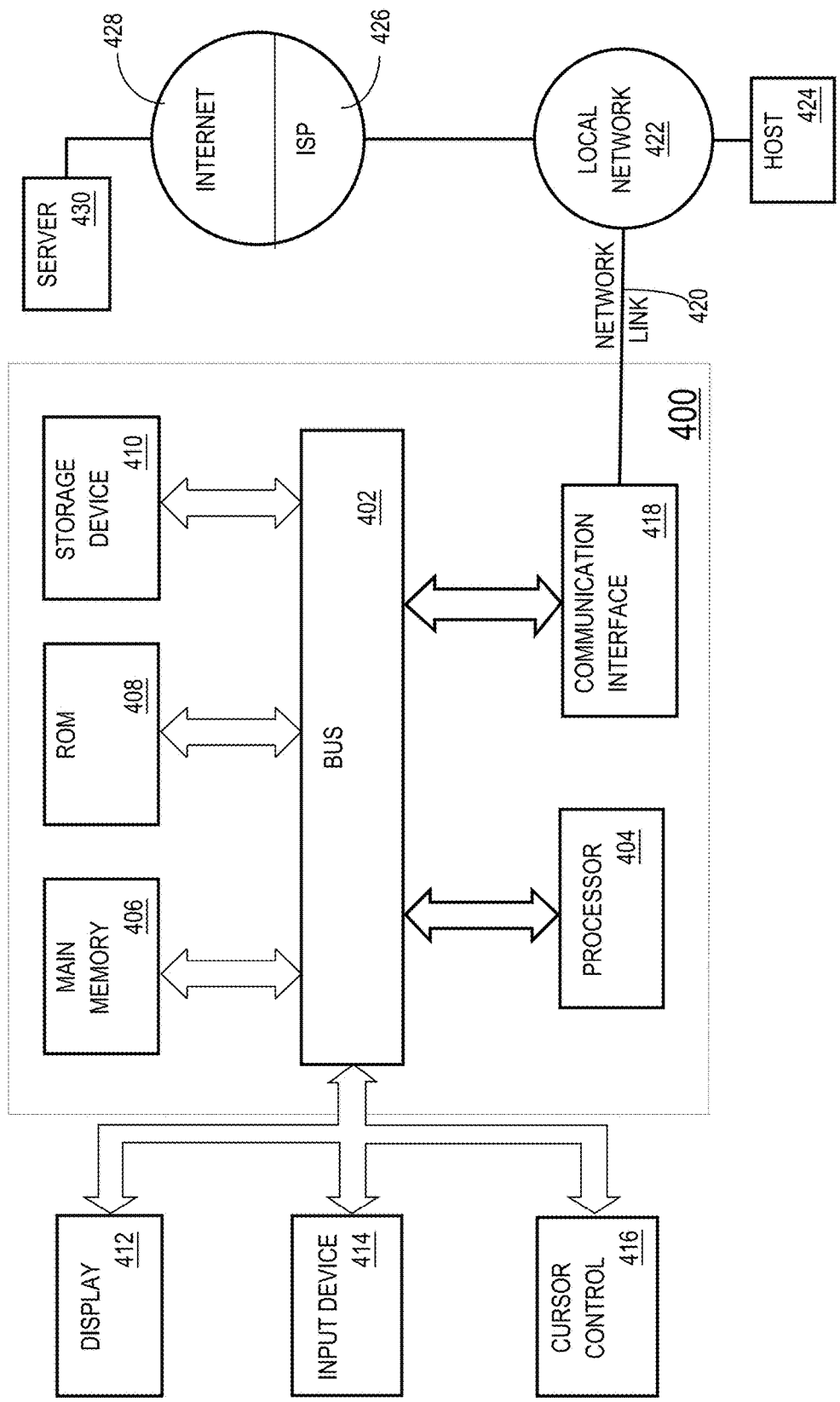
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, from a first wireless device by a subset of one or more network devices in a plurality of network devices, one or more wireless signals at respective signal strength values that are above a minimum threshold;
   determining a number of network devices in the subset of network devices that receive the wireless signals at respective signal strength values that are above the minimum threshold; and
   based at least on the number of network devices in the subset of network devices, modifying a wireless coverage configuration corresponding to a location associated with the first wireless device.

2. The medium of claim 1, wherein the minimum threshold is at least one of (a) a minimum signal strength threshold, and (b) a minimum signal-to-noise ratio threshold.

3. The medium of claim 1, wherein modifying the wireless coverage configuration corresponding to the location comprises: modifying a transmit power of one or more network devices associated with the location.

4. The medium of claim 1, wherein modifying the wireless coverage configuration corresponding to the location comprises: modifying a receive sensitivity of one or more network devices associated with the location.

5. The medium of claim 1, wherein modifying the wireless coverage configuration corresponding to the location comprises: modifying a wireless communication cell size of one or more network devices associated with the location.

6. The medium of claim 1, wherein modifying the wireless coverage configuration corresponding to the location comprises: adding a network device for providing wireless coverage to the location.

7. The medium of claim 6, wherein the operation of adding the network device for providing wireless coverage is responsive at least to determining that a cell size, of one or more network devices associated with the location, is at a maximum value.

8. The medium of claim 1, wherein modifying the wireless coverage configuration comprises: modifying at least one of (a) a Modulation and Coding Scheme (MCS) and (b) a physical layer (PHY) rate, configured for one or more network devices associated with the location.

9. The medium of claim 1, wherein modifying the wireless coverage configuration comprises modifying one or more of:
- a first threshold signal strength value used for determining whether or not to respond to a probe request; and
- a second threshold signal strength value used for determining whether or not to disconnect from a client device.

10. The medium of claim 1, wherein modifying the wireless coverage configuration corresponding to the location comprises: modifying a radio frequency (RF) channel of one or more network devices associated with the location.

11. The medium of claim 1, wherein the location associated with the first wireless device is determined based at least on a first physical location of the first wireless device and a second physical location of a second wireless device.

12. The medium of claim 1, wherein modifying the wireless coverage configuration corresponding to the location associated with the first wireless device is further responsive to determining that the location is not at an edge of a wireless coverage area corresponding the plurality of network devices.

13. A method, comprising:
- receiving, from a first wireless device by a subset of one or more network devices in a plurality of network devices, one or more wireless signals at respective signal strength values that are above a minimum threshold;
- determining a number of network devices in the subset of network devices that receive the wireless signals at respective signal strength values that are above the minimum threshold; and
- based at least on the number of network devices in the subset of network devices, modifying a wireless coverage configuration corresponding to a location associated with the first wireless device.

14. The method of claim 13, wherein modifying the wireless coverage configuration corresponding to the location comprises: modifying a transmit power of one or more network devices associated with the location.

15. The method of claim 13, wherein modifying the wireless coverage configuration corresponding to the location comprises: modifying a receive sensitivity of one or more network devices associated with the location.

16. The method of claim 13, wherein modifying the wireless coverage configuration corresponding to the location comprises: modifying a wireless communication cell size of one or more network devices associated with the location.

\* \* \* \* \*